United States Patent [19]

Kiefer

[11] Patent Number: 5,045,509

[45] Date of Patent: Sep. 3, 1991

[54] UV-TRANSPARENT GLASS

[75] Inventor: Werner Kiefer, Mainz-Finthen, Fed. Rep. of Germany

[73] Assignee: Schott Glaswerke, Mainz, Fed. Rep. of Germany

[21] Appl. No.: 299,166

[22] Filed: Jan. 19, 1989

[30] Foreign Application Priority Data

Jan. 20, 1988 [DE] Fed. Rep. of Germany ....... 3801840

[51] Int. Cl.$^5$ .................. C03C 4/08; C03C 3/118; C03C 3/091

[52] U.S. Cl. ...................... 501/59; 501/66; 501/905; 428/426; 428/432; 428/433

[58] Field of Search .................. 501/59, 66, 905; 428/426, 432, 433

[56] References Cited

U.S. PATENT DOCUMENTS 2,382,056 8/1945 Hood .................. 501/905

FOREIGN PATENT DOCUMENTS 60-21830 2/1985 Japan .................. 501/905
60-77144 5/1985 Japan .................. 501/905

*Primary Examiner*—Mark L. Bell
*Attorney, Agent, or Firm*—Millen, White & Zelano

[57] ABSTRACT

The invention relates to a glass which is transparent to UV radiation and which, for a thickness of 1 mm and the wavelength of 253.7 nm has a transmission of at least 75%, a linear coefficient of thermal expansion of $3.8 \times 10^{-6}$ to $4.5 \times 10^{-6} K^{-1}$ in the temperature range from 20° to 300° C. and a hydrolytic resistance of <120 μg of $Na_2O$/g according to DIN 12 111. The new glass has the synthesis composition, calculated on an oxide basis, of

| | |
|---|---|
| $SiO_2$ | 64 to 66.5 percent by weight |
| $B_2O_3$ | 20 to 22.5 percent by weight |
| $Al_2O_3$ | 4 to 6 percent by weight |
| $Li_2O$ | 0.4 to 1 percent by weight |
| $Na_2O$ | 1.0 to 3.5 percent by weight |
| $K_2O$ | 1.0 to 2.5 percent by weight |
| CaO | 0.35 to 0.8 percent by weight |
| BaO | 0.5 to 2.0 percent by weight |
| $F^-$ | 0.5 to 2.0 percent by weight |
| $\Sigma\ Li_2O + Na_2O + K_2O$ | 3.8 to 5.5 percent by weight |
| $\Sigma\ CaO + BaO$ | 1.0 to 2.5 percent by weight |
| one or more non-oxidizing refining agents | 0.2 to 2.0 percent by weight |
| one or more reducing agents | 0.05 to 0.3 percent weight. |

15 Claims, No Drawings

UV-TRANSPARENT GLASS

BACKGROUND OF THE INVENTION

The invention relates to a glass which has a good transparency to UV radiation. The glass is also intended to have a good hydrolytic resistance and a low thermal expansion, it being intended that the thermal expansion is such that the glass can produce a pressurized glazing with $Al_2O_3$ and, in addition, can form a seal with tungsten.

In order to ensure an optimum economic utilization of the glass, the properties of the glass should be such that it can be used, on the one hand, as window glass of EP-ROMs and, on the other hand, as a lamp for UV irradiation.

The term EP-ROM is the abbreviation for Erasable Programmable - Read Only Memory. This is a specific "read-only semiconductor storage device". In this semiconductor, the stored program can be erased by ultraviolet (UV) radiation. To hold the semiconductor, use is made of a housing of aluminum oxide ceramic which contains a window of highly UV-transparent glass. The UV transparency of the glass should be at least 70% for the wavelength 253.7 nm and a glass thickness of 1 mm. The glass window has to be sealed into the $Al_2O_3$ housing so that the interior of the housing is isolated in a gastight manner. This is achieved by using a glass with a lower thermal expansion than the $Al_2O_3$ ceramic. As the glass-ceramic seal cools, the ceramic housing shrinks onto the glass windows, seals the interior space in a gastight manner and places the glass under compressive stress. In order to guarantee the long-term use of the EP-ROMs even in countries with high atmospheric humidity, the glass windows must have a good hydrolytic resistance.

UV-transparent lamps are needed, for example, for therapeutic treatment or for sterilization. UV rays below 254 nm are harmful for therapeutic purposes, while UV rays up to 185 nm are important for sterilization. The production of lamps assumes that the glass used can form a seal with tungsten, Vacon 10 ® (an Ni/Fe/Co alloy) or molybdenum.

A UV-transparent glass is known from British Patent Specification 589,533. The glass described there contains 50–70% by weight of $SiO_2$, 4–10% by weight of $Al_2O_3$, 1–5% by weight of alkali-metal oxide and 20–40% by weight of $B_2O_3$. The teaching therein states that the alkali-metal oxide content should be kept as low as possible to produce a UV-transparent glass.

A further UV-transparent glass is known from the Japanese Patent Application 85-21830. This has the following composition: 60-70% by weight of $SiO_2$, 4-8% by weight of $Al_2O_3$, 18-25% by weight of $B_2O_3$, 6-11% by weight of $Li_2O+Na_2O+K_2O$, 0-4% by weight of $MgO+CaO+SrO+BaO+ZnO$ and 0-3% by weight of $F_2$. The glass has a coefficient of thermal expansion $\alpha$ of 5.0 to $5.8 \times 10^{-6} K^{-1}$ at 30° to 380° C.

The glasses known from the literature can in each case be used for specific purposes, such as, for example, for producing UV lamps or EP-ROM windows. However, no UV-transparent glass is known which is suitable for various possible applications.

SUMMARY OF THE INVENTION

This invention provides a UV-transparent glass which is suitable for several applications. In particular, the new glass can be used both for EP-ROM windows and for UV lamps.

According to the invention, there is provided a glass which, for a wall thickness of 1 mm and a wavelength of 253.7 nm, has a transparency of at least 75%, a linear coefficient of thermal expansion of $3.8 \times 10^{-6}$ to $4.5 \times 10^{-6} K^{-1}$ in the temperature range from 20° to 300° C., and a hydrolytic resistance of <120 μg of $Na_2O$/g according to DIN 12 111. The glass according to the invention with these properties has the following synthesis composition, calculated on an oxide basis:

| | |
|---|---|
| $SiO_2$ | 64.0 to 66.5 percent by weight |
| $B_2O_3$ | 20.0 to 22.5 percent by weight |
| $Al_2O_3$ | 4.0 to 6.0 percent by weight |
| $Li_2O$ | 0.4 to 1.0 percent by weight |
| $Na_2O$ | 1.0 to 3.5 percent by weight |
| $K_2O$ | 1.0 to 2.5 percent by weight |
| CaO | 0.35 to 0.8 percent by weight |
| BaO | 0.5 to 2.0 percent by weight |
| F⁻ | 0.5 to 2.0 percent by weight |
| $\Sigma\ Li_2O + Na_2O + K_2O$ | 3.8 to 5.5 percent by weight |
| $\Sigma\ CaO + BaO$ | 1.0 to 2.5 percent by weight |
| one or more non-oxidizing refining agents | 0.2 to 2.0 percent by weight |
| one or more reducing agents | 0.05 to 0.3 percent weight |

This "synthesis composition" can be melted under conditions usual in glass production to produce the final corresponding glass. Thus, "synthesis composition" has its usual meaning whereby, e.g., the oxides need not be added to the melt as oxides per se but as any appropriate starting forms, e.g., other salts, etc. These stated oxide amounts refer to total content of each oxide in the final glass including contributions derived from refining and/or reducing agents, if any.

It is known that the UV transparency of glass can be improved by reducing the iron content. Thus, low-iron content starting materials should be used where possible. Equally as important as the reduction of the total iron content is the most complete reduction possible of the iron to $Fe^{2+}$. The glasses must therefore not contain (i.e., be essentially free of) any oxidizing agents, such as nitrate, or oxidizing refining agents, such as $As_2O_3$ or $Sb_2O_3$, and preferably contain a reducing agent. As well, they should contain a small amount of refining agent.

It is also known that glasses with a high boric acid content can be refined fairly well with NaCl. However, other refining agents are also possible, including, e.g., all the alkali metal halides and all the alkaline earth metal halides, especially the chlorides and fluorides, e.g., potassium chloride, barium fluoride, calcium fluoride, etc. Sugar or aluminum powder is preferably used for reduction. Other suitable reducing agents include, e.g., organic compounds like sugar and starch, or metal powders like aluminum.

Investigations have revealed that a UV glass can be used both for EP-ROM windows and for UV lamps if the thermal expansion—as one parameter—can be adjusted to 3.8 to $4.5 \times 10^{-6} K^{-1}$. According to the invention, this adjustment of the thermal expansion is achieved by an alkali-metal oxide content of 4.0 to 5.0% by weight and an alkaline-earth metal oxide content of 1.0×2.5% by weight.

Glasses with a high boric acid content are known to have very poor hydrolytic properties. Surprisingly, it was found that the high requirements imposed on the hydrolytic resistance are fulfilled if the ranges for the alkali-metal oxides and alkaline-earth metal oxides according to the invention are maintained.

$Li_2O$ content of 0.4 by weight to 1.0% by weight lowers the melting point. $Li_2O$ content of over 1.0% by weight has an adverse effect on the hydrolytic resistance. $Na_2O$ content of over 3.5% by weight also affects the hydrolytic resistance adversely. CaO and BaO are most suitable as alkaline earths. Even small quantities (for example, 0.30% by weight) of MgO result in opacification of the glass. CaO also results in a slight opacification of the glass; according to the invention, the upper limit for CaO is therefore 0.8% by weight. CaO has, on the other hand, a very favorable effect on the hydrolytic resistance; the glass should therefore contain at least 0.3% by weight of CaO. The BaO also contributes to improving the hydrolytic resistance; the total of CaO + BaO should therefore not be below 1.0% by weight. Although, it is possible to use SrO instead of BaO, it is more expensive.

The $Al_2O_3$ content should not exceed 6.0% by weight. On the one hand, the working point $V_4$($V_4$ = working point for $10^4$dPas) rises to over 1160° C. and, on the other hand, it has been found that the hydrolytic resistance becomes poorer if the $Al_2O_3$ content exceeds 6.0% by weight. With an $Al_2O_3$ content below 4% by weight, the glass becomes milky. A $B_2O_3$ content over 22.5% by weight also has an adverse effect on the hydrolytic resistance. A fluorine content of 0.5 to 2.0% by weight improves the fusion and refining behavior without having an adverse effect on the UV transparency.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight, unless otherwise indicated.

Table 1 shows examples of the glass compositions according to the invention in percent by weight. The glasses were produced by fusing the following low-iron raw materials: $SiO_2$ as sand (low in $Fe_2O_3$; trade name Sipur), $B_2O_3$ as boric acid; $Al_2O_3$ as $Al(OH)_3$; $LiO_2$, $K_2O$, CaO and BaO as carbonate and NaCl; $F^-$ as $Na_2SiF_6$; NaCl was used as refining agent and sugar as reducing agent.

The glasses were fused in a quartz crucible for 1.5 to 2.5 hours at between 1500° and 1650° C. (preferably, 1550° C.) and refined for 2.5 to 4 hours at between 1450° and 1600° C. (preferably, 1500° C.).

Table 2 contains the physical and chemical properties of the glasses in Table 1.

The linear thermal expansion α was measured from 20° to 300° C. The α values are between 3.8 and $4.5 \times 10^{-6} K^{-1}$. $T_g$ signifies the transformation point in °C. The working point $V_4$ in °C. is the temperature for a glass viscosity of $10^4$dPas. The hydrolytic resistance H is determined according to DIN 12 111 in μg of $Na_2O$ per g of glass. The UV transparency τ was determined on specimens 1 mm thick for the wavelength of 253.7 nm.

TABLE 1

| | Chemical composition in percent by weight | | | | | | | | | | |
|---|---|---|---|---|---|---|---|---|---|---|---|
| | Glass 1 | Glass 2 | Glass 3 | Glass 4 | Glass 5 | Glass 6 | Glass 7 | Glass 8 | Glass 9 | Glass 10 | Glass 11 |
| $SiO_2$ | 64.65 | 64.65 | 65.65 | 64.65 | 65.15 | 64.15 | 64.85 | 65.65 | 66.30 | 65.50 | 64.60 |
| $B_2O_3$ | 22.20 | 21.20 | 22.20 | 22.20 | 22.00 | 22.20 | 22.20 | 21.20 | 20.00 | 21.70 | 21.70 |
| $Al_2O_3$ | 5.00 | 6.00 | 4.00 | 5.00 | 5.00 | 5.00 | 4.70 | 4.60 | 6.00 | 4.60 | 5.00 |
| $Li_2O$ | 0.75 | 0.75 | 0.75 | 0.75 | 0.75 | 0.75 | 0.75 | 0.75 | 0.50 | 0.60 | 1.00 |
| $Na_2O$ | 1.30 | 1.30 | 1.30 | 0.80 | 1.50 | 1.30 | 1.70 | 1.60 | 2.50 | 1.60 | 1.60 |
| $Na_2O$* | (1.05) | (1.05) | (1.05) | (1.05) | (1.05) | (1.05) | (0.2) | (0.7) | (0.7) | (0.70) | (0.70) |
| $K_2O$ | 1.50 | 1.50 | 1.50 | 2.00 | 1.00 | 2.00 | 1.80 | 1.80 | 1.00 | 1.80 | 1.80 |
| CaO | 0.60 | 0.60 | 0.60 | 0.60 | 0.60 | 0.60 | 0.60 | 0.60 | 0.60 | 0.40 | 0.50 |
| BaO | 0.90 | 0.90 | 0.90 | 0.90 | 0.90 | 0.90 | 1.50 | 1.20 | 0.50 | 1.20 | 1.20 |
| $F^-$ | 1.60 | 1.60 | 1.60 | 1.60 | 1.60 | 1.60 | 1.60 | 1.60 | 1.60 | 1.60 | 1.60 |
| NaCl | 1.50 | 1.50 | 1.50 | 1.50 | 1.50 | 1.50 | 0.30 | 1.00 | 1.00 | 1.00 | 1.00 |
| Sugar | 0.12 | 0.12 | 0.12 | 0.12 | 0.10 | 0.12 | 0.175 | 0.15 | 0.15 | 0.12 | 0.12 |
| Total | 100.12 | 100.12 | 100.12 | 100.12 | 100.10 | 100.12 | 100.175 | 100.15 | 100.15 | 100.12 | 100.12 |
| Σ $R_2O$ | 4.60 | 4.60 | 4.60 | 4.60 | 4.3 | 5.10 | 4.45 | 4.85 | 4.70 | 4.70 | 5.10 |
| Σ RO | 1.50 | 1.50 | 1.50 | 1.50 | 1.50 | 1.50 | 2.10 | 1.80 | 1.10 | 1.60 | 1.70 |

$Na_2O$* from NaCl
Σ $R_2O$ also contains $Na_2O$ as NaCl

TABLE 2

| | Physical and chemical properties | | | | | | | | | | |
|---|---|---|---|---|---|---|---|---|---|---|---|
| | Glass 1 | Glass 2 | Glass 3 | Glass 4 | Glass 5 | Glass 6 | Glass 7 | Glass 8 | Glass 9 | Glass 10 | Glass 11 |
| α | 4.06 | 4.04 | 3.91 | 3.99 | 3.89 | 4.11 | 4.01 | 4.03 | 4.17 | 3.96 | 4.07 |
| $T_g$ | 431 | 444 | 441 | 444 | 437 | 442 | 431 | 440 | 440 | 436 | 429 |
| $V_4$ | 1125 | 1153 | 1104 | 1107 | 1125 | 1103 | 1105 | 1099 | 1156 | 123 | 1073 |
| α | 2.210 | 2.213 | 2.209 | 2.207 | 2.209 | 2.213 | 2.218 | 2.228 | 2.213 | 2.213 | 2.225 |
| H | 78 | 105 | 33 | 64 | 109 | 73 | 49 | 32 | 92 | 100 | 84 |
| τ | 87 | 87 | 86 | 81 | 87 | 86 | 84 | 86 | 83 | 85 | 79 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A glass transparent to UV radiation, which, for a thickness of 1 mm and the wavelength of 253.7 nm, has a transmission of at least 75%, a linear coefficient of thermal expansion of $3.8 \times 10^{-6}$ to $4.5 \times 10^{-6} K^{-1}$ in the temperature range from 20° to 300° C., and a hydrolytic resistance of <120 μg of $Na_2O$/g according to DIN 12 111, and having a synthesis composition, calculated on an oxide basis, of

| | |
|---|---|
| $SiO_2$ | 64 to 66.5 |
| $B_2O_3$ | 20 to 22.5 |
| $Al_2O_3$ | 4 to 6 |
| $Li_2O$ | 0.4 to 1 |
| $Na_2O$ | 1.0 to 3.5 |
| $K_2O$ | 1.0 to 2.5 |
| CaO | 0.3 to 0.8 |
| BaO | 0.5 to 2.0 |
| $F^-$ | 0.5 to 2.0 |
| $\Sigma\ Li_2O + Na_2O + K_2O$ | 3.8 to 5.5 |
| $\Sigma\ CaO + BaO$ | 1.0 to 2.5 |
| one or more non-oxidizing refining agents | 0.2 to 2.0 |
| one or more reducing agents | 0.05 to 0.3. |

2. A UV-transparent glass of claim 1, wherein NaCl is the refining agent.

3. A UV-transparent glass of claim 1, wherein sugar is the reducing agent.

4. A UV-transparent glass of claim 1, wherein aluminum powder is the reducing agent.

5. A UV-transparent glass of claim 1, which is essentially Fe free.

6. A UV-transparent glass of claim 1, which is essentially $Fe^{+3}$ free.

7. A UV-transparent glass of claim 1, which is oxidizing agent free.

8. In an EP-ROM comprising a window of highly UV-transparent glass, the improvement wherein said glass is one of claim 1.

9. An EP-ROM of claim 8 wherein said window is sealed to $Al_2O_3$.

10. In a UV-transparent lamp comprising a UV-transparent glass sealed to a metal, the improvement wherein said glass is one of claim 1.

11. A lamp of claim 10, wherein said metal is tungsten.

12. In a UV-transparent glass to metallic element seal, the improvement wherein the glass is one of claim 1 and the metallic element is tungsten or $Al_2O_3$.

13. A UV transparent glass of claim 1, wherein for a thickness of 1 mm and the wavelength of 253.7 nm, the transmission falls within the range of 85-87%.

14. A UV transparent glass of claim 1, wherein for a thickness of 1 mm and the wavelength of 253.7, the transmission is greater than 83%.

15. A UV-transparent glass to $Al_2O_3$ pressurized glazing, the improvement wherein the glass is one of claim 1.

* * * * *